US012407116B2

(12) United States Patent
Tanaka et al.

(10) Patent No.: US 12,407,116 B2
(45) Date of Patent: Sep. 2, 2025

(54) TERMINAL FITTING, CONNECTOR AND METHOD FOR MANUFACTURING TERMINAL FITTING

(71) Applicant: Yazaki Corporation, Tokyo (JP)

(72) Inventors: Masaki Tanaka, Makinohara (JP); Naoki Kobayashi, Makinohara (JP); Jun Ishikawa, Tokyo (JP)

(73) Assignee: Yazaki Corporation, Tokyo (JP)

( * ) Notice: Subject to any disclaimer, the term of this patent is extended or adjusted under 35 U.S.C. 154(b) by 308 days.

(21) Appl. No.: 18/353,451

(22) Filed: Jul. 17, 2023

(65) Prior Publication Data

US 2024/0055782 A1 Feb. 15, 2024

(30) Foreign Application Priority Data

Aug. 12, 2022 (JP) ................................ 2022-129008

(51) Int. Cl.
*H01R 4/30* (2006.01)
*H01R 43/16* (2006.01)

(52) U.S. Cl.
CPC ............... *H01R 4/30* (2013.01); *H01R 43/16* (2013.01); *H01R 2201/26* (2013.01)

(58) Field of Classification Search
CPC ....... H01R 4/30; H01R 43/16; H01R 2201/26
USPC .......................................................... 439/108
See application file for complete search history.

(56) References Cited

U.S. PATENT DOCUMENTS

| | | |
|---|---|---|
| 2014/0141662 A1 | 5/2014 | Kutsuna |
| 2017/0098904 A1 | 4/2017 | Kim et al. |

FOREIGN PATENT DOCUMENTS

| | | |
|---|---|---|
| JP | S48-043989 U | 6/1973 |
| JP | 2011-065931 A | 3/2011 |
| JP | 2013-026155 A | 2/2013 |
| JP | 2018-125155 A | 8/2018 |

*Primary Examiner* — Peter G Leigh
(74) *Attorney, Agent, or Firm* — Banner & Witcoff, Ltd.

(57) ABSTRACT

A terminal fitting comprising: a first terminal portion in which first tab portions, extending from a first tab continuous connecting portion, are arranged; a second terminal portion in which second tab portions, extending from a second tab continuous connecting portion, are arranged; a connecting portion connecting the first and second terminal portions; and a contact portion to be connected to an external terminal. The terminal fitting has a three-dimensional shape in which the terminal fitting having a preliminary shape is bent at the connecting portion. In the three-dimensional shape, the first terminal portion and the second terminal portion are three-dimensionally arranged to be connected at the connecting portion. In the preliminary shape, the first terminal portion and the second terminal portion are arranged to be fitted to each other, and the first tab continuous connecting portion and the second tab continuous connecting portion are connected at the connecting portion.

5 Claims, 9 Drawing Sheets

TERMINAL FITTING, CONNECTOR AND METHOD FOR MANUFACTURING TERMINAL FITTING

CROSS-REFERENCE TO RELATED APPLICATION(S)

This application is based upon and claims the benefit of priority from prior Japanese patent application No. 2022-129008 filed on Aug. 12, 2022, the entire contents of which are incorporated herein by reference.

BACKGROUND

1. Field of the Invention

The present disclosure relates to a terminal fitting in which a plurality of tab portions are arranged three-dimensionally, a connector in which the terminal fitting is attached to a housing, and a method for manufacturing the terminal fitting.

2. Description of the Related Art

In the related art, a terminal fitting has been proposed which is manufactured such that a plate-shaped conductor plate (original plate) is punched to prepare a preformed body having a flat plate-shaped preliminary shape, and the preformed body is processed to be bent to have a three-dimensional final shape. Since such a terminal fitting is composed of a continuous conductor plate, the terminal fitting is used as, for example, a joint terminal for connecting a plurality of circuits or a ground terminal for grounding a plurality of circuits.

In one connector of the related art, such type of terminal fitting is used as a ground terminal. Specifically, in the preliminary shape, the terminal fitting includes a rectangular main body portion, a plurality of first tab portions extending from one edge portion of the main body portion, and a plurality of second tab portions extending in the opposite direction to the first tab portions from the other edge portion of the main body portion, and in the final shape, the main body portion is bent such that the first tab portions and the second tab portions extend in the same direction. Then, the terminal fitting is attached to the housing such that the first tab portion and the second tab portion are accommodated in a terminal accommodating chamber of the housing. The terminal fitting is electrically connected to a predetermined ground point (for example, a vehicle body frame of an automobile), and collectively grounds a plurality of circuits connected to the counterpart terminals connected to the first tab portion and the second tab portion (for example, refer to JP2011-065931A).

In the terminal fitting used in the above-described connector of the related art, in the preliminary shape, the first tab portions and the second tab portions extend in the opposite direction from the main body portion. Therefore, when a flat plate-shaped conductor plate (original plate) is actually punched, the conductor plate (original plate) positioned between the adjacent first tab portions or between the adjacent second tab portions is usually discarded as discarded parts. By reducing the amount of such discarded parts as much as possible, it is possible to improve the yield of materials when manufacturing terminal fittings.

SUMMARY

One of the objects of the present disclosure is to provide a terminal fitting capable of improving the yield of materials during manufacturing, a connector in which the terminal fitting is attached to a housing, and a method for manufacturing the terminal fitting.

To achieve the above object, a terminal fitting, a connector, and a method for manufacturing the terminal fitting according to the present disclosure are characterized as follows.

According to an aspect of the present disclosure, there is provided a terminal fitting including: a first terminal portion in which a plurality of first tab portions, extending from a first tab continuous connecting portion, are arranged at intervals; a second terminal portion in which a plurality of second tab portions, extending from a second tab continuous connecting portion, are arranged at intervals; a connecting portion connecting the first terminal portion and the second terminal portion; and a contact portion to be connected to an external terminal, in which: the first terminal portion, the second terminal portion, the connecting portion, and the contact portion are continuous as a continuous conductor plate; the terminal fitting has a three-dimensional shape in which the terminal fitting having a preliminary shape, being flat plate-shape, is bent at the connecting portion; in the three-dimensional shape, the first terminal portion and the second terminal portion are three-dimensionally arranged to be connected at the connecting portion such that the plurality of the first tab portions and the plurality of the second tab portions are arranged in a predetermined arrangement direction, and the first tab continuous connecting portion and the second tab continuous connecting portion are arranged at intervals in an intersection direction intersecting the arrangement direction; and in the preliminary shape, the first terminal portion and the second terminal portion are arranged to be fitted to each other, and the first tab continuous connecting portion and the second tab continuous connecting portion are connected at the connecting portion such that the second tab portion is accommodated in the gap between the adjacent first tab portions, and the first tab portion is accommodated in the gap between the adjacent second tab portions.

According to another aspect of the present disclosure, there is provided a connector including: the terminal fitting according to the above; and a housing which includes a plurality of terminal accommodating chambers for accommodating the plurality of first tab portions and the plurality of second tab portions, and to which the terminal fitting is attached.

According to still another aspect of the present disclosure, there is provided a method for manufacturing the terminal fitting according to the above, the method including: manufacturing a preformed body in which the first terminal portion and the second terminal portion are fitted to each other and connected at the connecting portion such that the second tab portions are accommodated in the gaps between the adjacent first tab portions and the first tab portions are accommodated in the gaps between the adjacent second tab portions, by punching a flat plate-shaped conductor plate; and three-dimensionally arranging the first terminal portion and the second terminal portion such that the plurality of the first tab portions and the plurality of the second tab portions are arranged in the arrangement direction, and the first tab continuous connecting portion and the second tab continuous connecting portion are arranged at intervals in an intersection direction intersecting the arrangement direction, by bending the preformed body at the connecting portion.

According to the terminal fitting, the connector, and the method for manufacturing the terminal fitting of the present disclosure, in the terminal fitting, in the preliminary shape, the first terminal portion and the second terminal portion are arranged to be fitted to each other such that the second tab portions are accommodated in the gaps between the adjacent first tab portions, and the first tab portions are accommodated in the gaps between the adjacent second tab portions. In the terminal fitting, in the final three-dimensional shape, the preformed body having the preliminary shape is bent at the connecting portion, and accordingly, the first terminal portion and the second terminal portion are three-dimensionally arranged such that the first tab portions and the second tab portions are arranged in a predetermined arrangement direction, and the first tab continuous connecting portion and the second tab continuous connecting portion are arranged at intervals in the intersection direction intersecting the arrangement direction. As a result, compared with the terminal fittings of the above-described connector of the related art, the conductor plate (original plate) between the first tab portions or between the second tab portions is not discarded as it is, and thus the amount of discarded conductor plate (original plate) during manufacturing is reduced. Therefore, the terminal fitting, the connector, and the method for manufacturing the terminal fitting having the present configuration can improve the yield of materials when manufacturing the terminal fitting.

The present disclosure has been briefly described above. The details of the present disclosure will be further clarified by reading the detailed description below with reference to the accompanying drawings.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

First Embodiment

Figure 1:
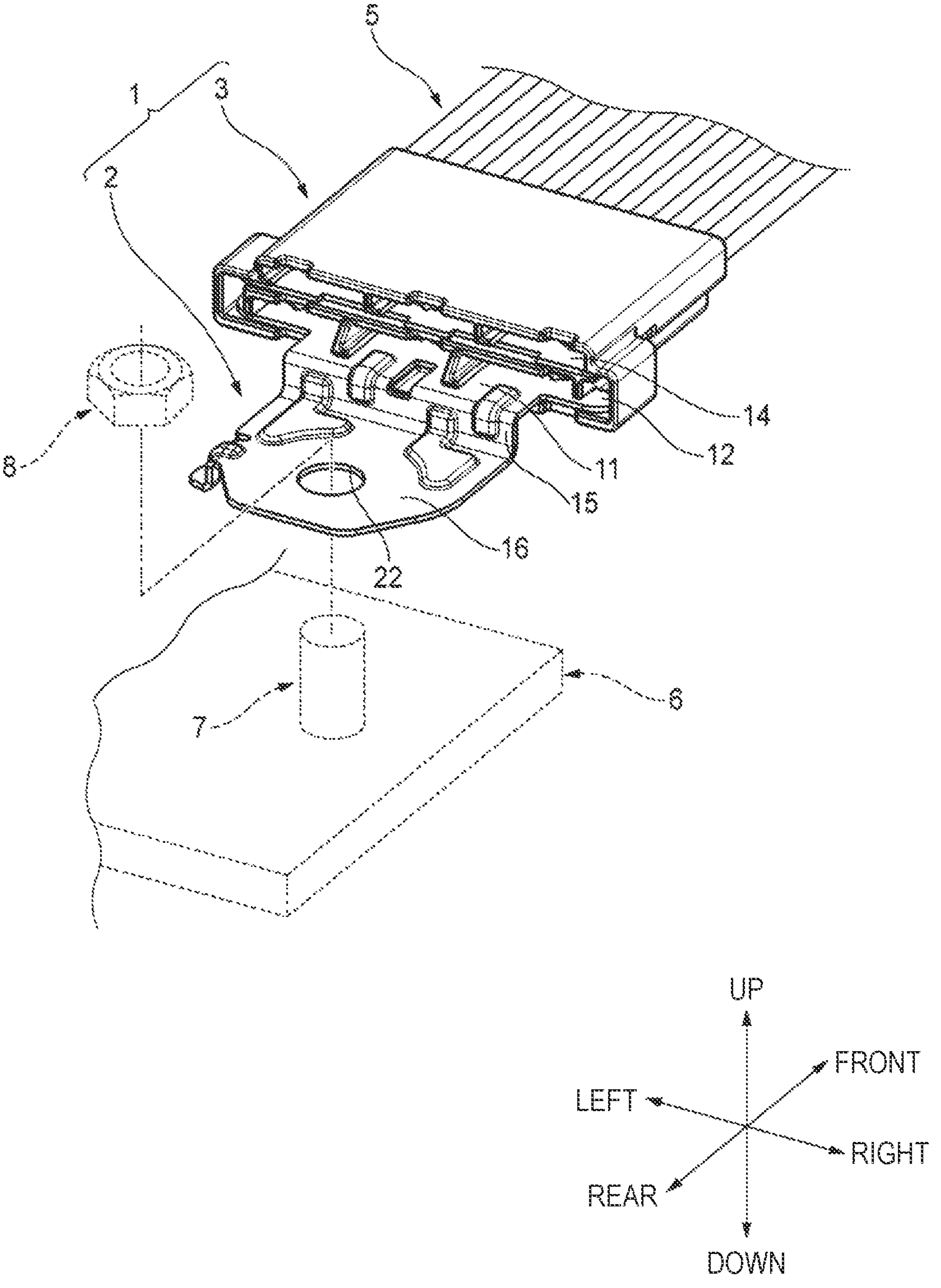
FIG. 1 is a perspective view showing a connector including a terminal fitting according to a first embodiment of the present disclosure.

A connector 1 in which a terminal fitting 2 according to an embodiment of the present disclosure is attached to a housing 3 will be described below with reference to the drawings. Hereinafter, for convenience of explanation, "front", "rear", "left", "right", "upper", and "lower" are defined as shown in FIGS. 1 to 9. The "front-rear direction", the "left-right direction", and the "up-down direction" are orthogonal to each other. The front-rear direction coincides with the attachment direction of the terminal fitting 2 to the housing 3 and the insertion direction of the counterpart terminal 4 (refer to FIG. 2) connected to terminals of electric wires 5 into the housing 3. The left-right direction and the up-down direction respectively correspond to the "arrangement direction" and the "intersection direction" of the present disclosure.

Figure 2:
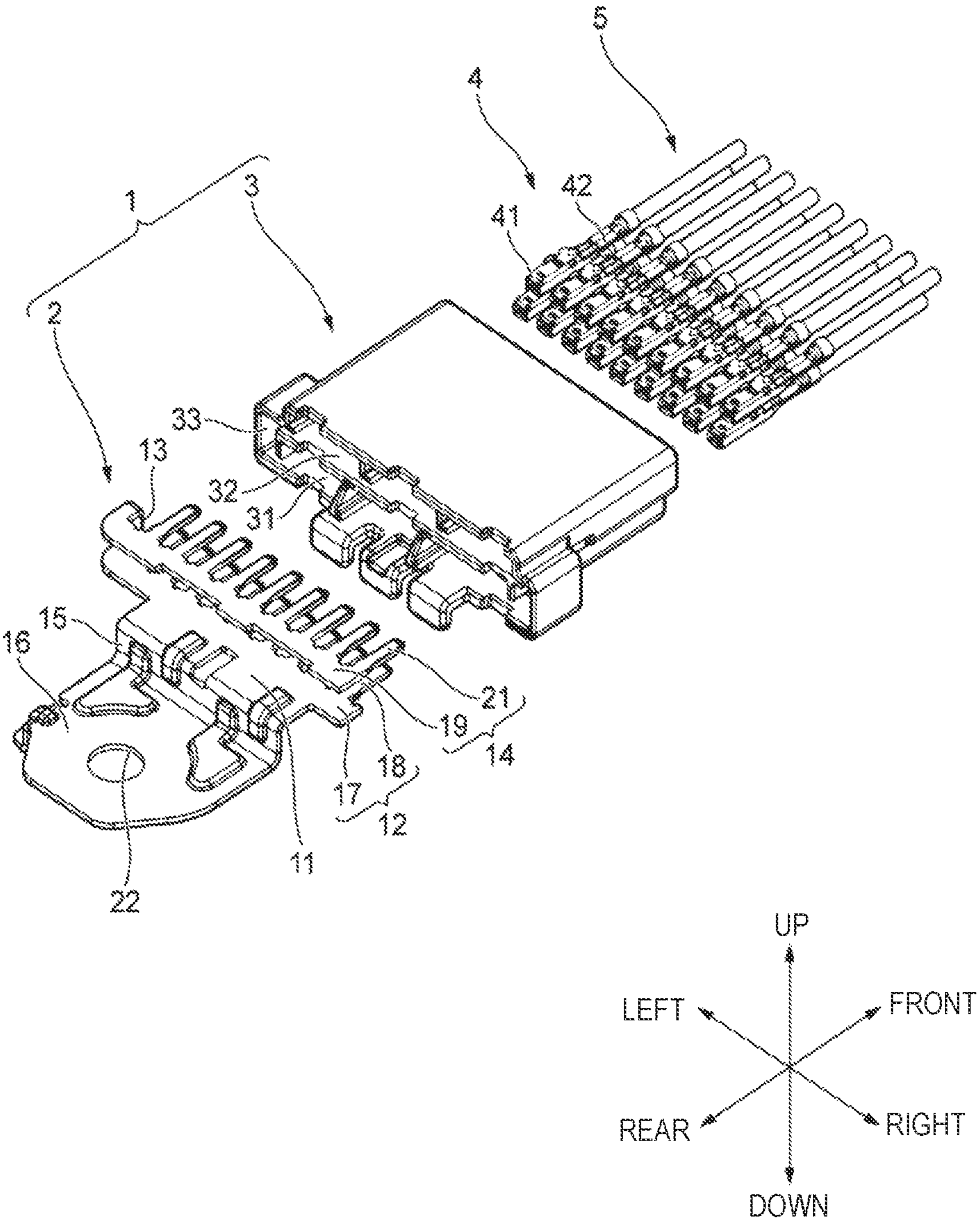
FIG. 2 is a perspective view showing the terminal fitting and a housing, which configure the connector shown in FIG. 1, and a counterpart terminal connected to electric wires.

As shown in FIGS. 1 and 2, the connector 1 includes the terminal fitting 2 and the housing 3 to which the terminal fitting 2 is attached from the rear side. The terminal fitting 2 is electrically connected to a predetermined grounding point 6 (refer to FIG. 1, for example, a vehicle body frame of an automobile), and a plurality of counterpart terminals 4 connected to terminals of a plurality of electric wires 5 are inserted into the housing 3 from the front side. Accordingly, the connector 1 collectively grounds a plurality of electric wires 5 (that is, a plurality of circuits) connected to the plurality of counterpart terminals 4 conductively connected to the terminal fitting 2. Each member configuring the connector 1 will be described below.

Figure 3:
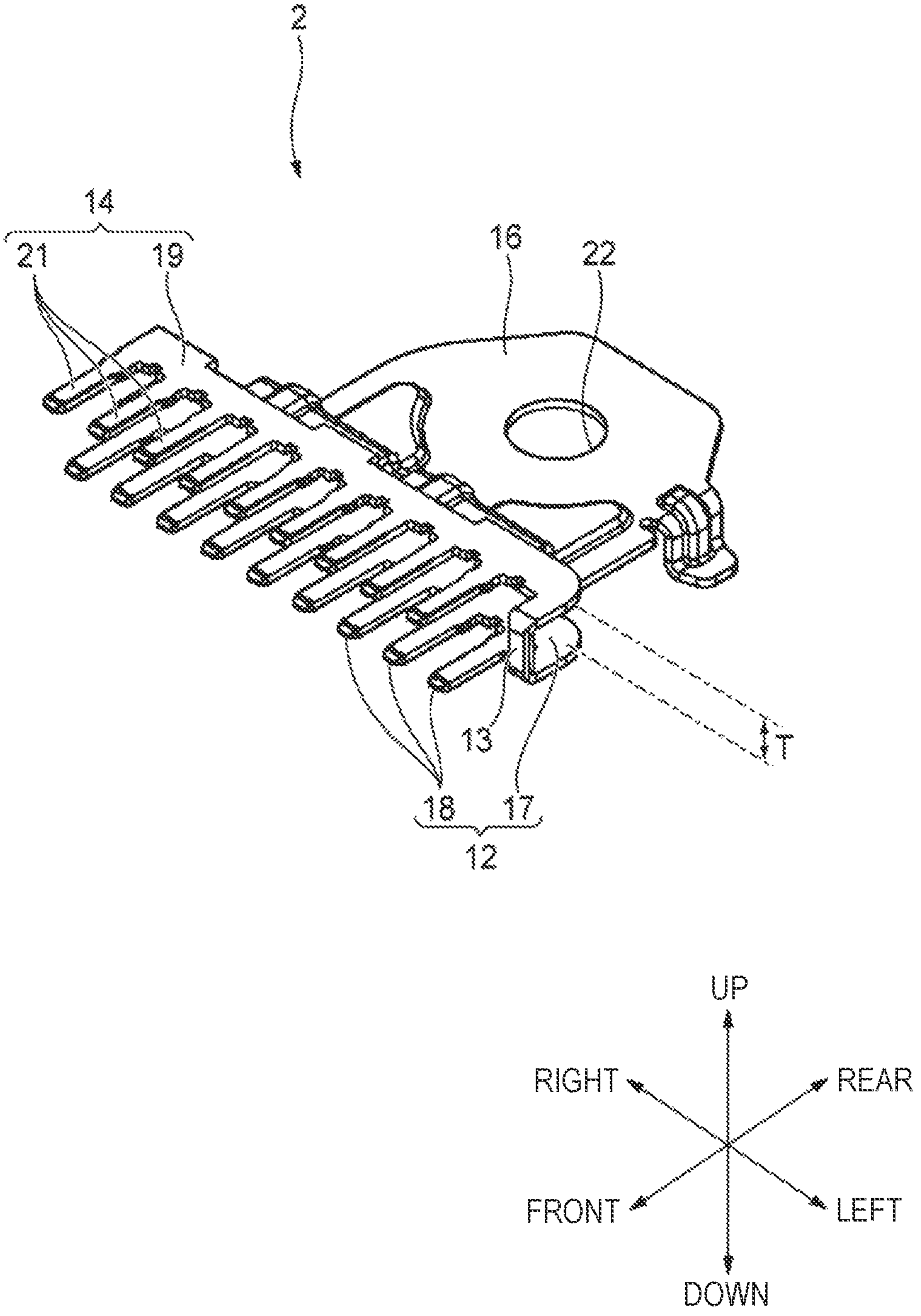
FIG. 3 is a perspective view when the terminal fitting shown in FIG. 2 is viewed from the front.

First, the terminal fitting 2 will be described. The terminal fitting 2 is formed by subjecting a preformed body 2A (refer to FIG. 4) to be described later, which is obtained by punching a flat plate-shaped conductor plate, to a predetermined bending process. As shown in FIGS. 2 and 3, the terminal fitting 2 has a three-dimensional shape in which a substantially rectangular flat plate-shaped main body portion 11 elongated in the left-right direction, a first terminal portion 12 positioned in front of the main body portion 11 and extending in the left-right direction, a connecting portion 13 extending upward from the left end portion of the first terminal portion 12, a second terminal portion 14 extending rightward from the upper end portion of the connecting portion 13, a substantially rectangular flat plate-shaped stepped portion 15 extending downward from the rear end edge of the main body portion 11 and elongated in the left-right direction, and a flat plate-shaped fixing portion 16 extending rearward from the lower end edge of the stepped portion 15, are provided integrally. A through-hole 22 is formed to penetrate the fixing portion 16 in the plate thickness direction (up-down direction).

The left end portions of both of the first terminal portion 12 and the second terminal portion 14 are connected to each other at the connecting portion 13, and accordingly, the first terminal portion 12 and the second terminal portion 14 are three-dimensionally arranged to face each other with an interval T (refer to FIG. 3) in the up-down direction and extend to be parallel to each other in the left-right direction. The right ends of the first terminal portion 12 and the second terminal portion 14 are not connected to each other, and each are free ends.

As shown in FIGS. 2 and 3, the first terminal portion 12 includes a substantially rectangular flat plate-shaped first tab continuous connecting portion 17 positioned on the front side of the main body portion 11 and elongated in the left-right direction, and a plurality of first tab portions (male terminal portions) 18 extending forward from the front end edge of the first tab continuous connecting portion 17 extending in the left-right direction at regular intervals in the left-right direction. Similarly, the second terminal portion 14 includes a substantially rectangular flat plate-shaped second tab continuous connecting portion 19 positioned on the upper side of the first tab continuous connecting portion 17 and elongated in the left-right direction, and a plurality of second tab portions (male terminal portions) 21 extending forward from the front end edge of the second tab continuous connecting portion 19 extending in the left-right direction at regular intervals in the left-right direction. The plurality of first tab portions 18 and the plurality of second tab portions 21 are arranged parallel to each other in the left-right direction at the interval T (refer to FIG. 3) in the up-down direction, and the tip ends of the plurality of first tab portions 18 and the tip ends of the plurality of second tab portions 21 are arranged at the same position in the front-rear direction. In the left-right direction, the first tab portions 18 are positioned between the second tab portions 21 adjacent in the left-right direction, and the second tab portions 21 are positioned between the first tab portions 18 adjacent in the left-right direction.

The above-described terminal fitting 2 having the three-dimensional shape is manufactured by the following procedure. First, a flat plate-shaped conductor plate (original plate) is punched to prepare a substantially flat plate-shaped preformed body 2A shown in FIG. 4. Next, the preformed body 2A is subjected to 90-degree bending including valley-folding along a boundary line L1 between the fixing portion 16 and the stepped portion 15 (here, valley-fold when viewed from above (the front side of the paper surface) in FIG. 4, the same applies hereinafter), mountain-folding along a boundary line L2 between the stepped portion 15 and the main body portion 11, valley-folding along a boundary line L3 between the first tab continuous connecting portion 17 and the connecting portion 13, and valley-folding along a boundary line L4 between the connecting portion 13 and the second tab continuous connecting portion 19. As a result, the terminal fitting 2 having the three-dimensional shape shown in FIGS. 2 and 3 is obtained.

Figure 4:
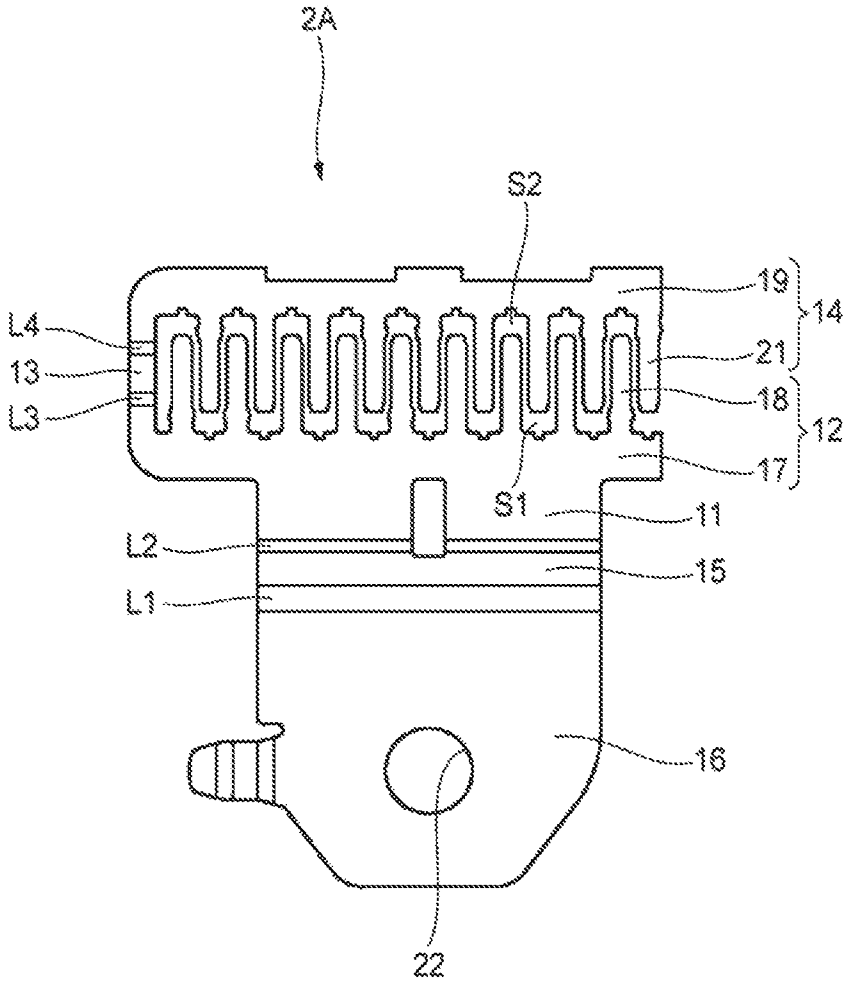
FIG. 4 is a plan view showing a preformed body used for manufacturing the terminal fitting shown in FIG. 2.
Figure 4:
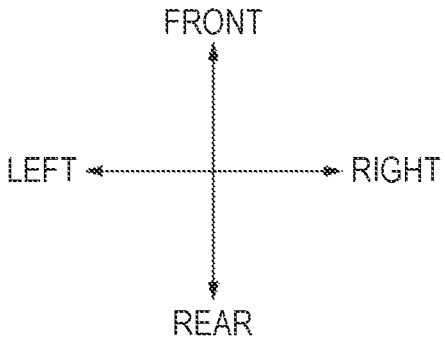

Here, in the preformed body 2A, as shown in FIG. 4, the first terminal portion 12 and the second terminal portion 14 are arranged to be fitted to each other such that the second tab portions 21 are accommodated in gaps S1 between the first tab portions 18 adjacent in the left-right direction, and the first tab portions 18 are accommodated in gaps S2 between the second tab portions 21 adjacent in the left-right direction. As a result, compared with the terminal fittings of the above-described connector of the related art, the conductor plate (original plate) between the first tab portions 18 or between the second tab portions 21 is not discarded as it is, and thus the amount of discarded conductor plate (original plate) during manufacturing is reduced.

Next, the housing 3 will be described. The housing 3 is a resin molded body, and has a substantially rectangular cylindrical shape that is flat in the up-down direction and extends in the front-rear direction, as shown in FIG. 2. In the hollow portion of the housing 3, a first terminal accommodating chamber 31 for accommodating the first terminal portion 12 (the plurality of first tab portions 18) of the terminal fitting 2, a second terminal accommodating chamber 32 for accommodating the second terminal portion 14 (the plurality of second tab portions 18) of the terminal fitting 2, and a connecting portion accommodating chamber 33 for accommodating the connecting portion 13 of the terminal fitting 2 are defined. Each member configuring the connector 1 has been described above.

The connector 1 shown in FIG. 1 is obtained by inserting the terminal fitting 2 into the housing 3 from the rear side. When the terminal fitting 2 is completely inserted into the housing 3 (when the assembly of the connector 1 is completed), the first terminal portion 12 (the plurality of first tab portions 18) of the terminal fitting 2 is accommodated in the first terminal accommodating chamber 31 of the housing 3, the second terminal portion 14 (the plurality of second tab portions 21) of the terminal fitting 2 is accommodated in the second terminal accommodating chamber 32 of the housing 3, and the connecting portion 13 of the terminal fitting 2 is accommodated in the connecting portion accommodating chamber 33 of the housing 3.

As shown in FIGS. 1 and 2, in the connector 1, a plurality of counterpart terminals (female terminals) 4 connected to terminals of the plurality of electric wires 5 and arranged in the left-right direction in two up and down stages are inserted and accommodated in the housing 3 from the front side. As shown in FIG. 2, the counterpart terminal 4 integrally includes a box-shaped female terminal portion 41 into which the first tab portion 18 or the second tab portion 21 of the terminal fitting 2 is inserted, and an electric wire connecting portion 42 connected to the terminals of the electric wires 5. The plurality of counterpart terminals 4 arranged in the lower stage are accommodated in the first terminal accommodating chambers 31 and electrically connected to the plurality of first tab portions 18 respectively, and the plurality of counterpart terminals 4 arranged in the upper stage are accommodated in the second terminal accommodating chamber 32 and electrically connected to each of the plurality of second tab portions 21.

As shown in FIG. 1, the connector 1 to which a plurality of electric wires 5 are connected is fixed to the predetermined ground point 6 (vehicle body frame of an automobile, and the like) by fastening the fixing portion 16 of the terminal fitting 2 to the grounding point 6. For example, as shown in FIG. 1, fastening the fixing portion 16 to the ground point 6 is performed by inserting a stud bolt 7 provided on the ground point 6 into the through-hole 22 of the fixing portion 16 and fastening a nut 8 on the stud bolt 7. As a result, the plurality of electric wires 5 (that is, the plurality of circuits) connected to a plurality of counterpart terminals 4 conductively connected to the terminal fitting 2 are collectively grounded.

Above, according to the terminal fitting 2 of the first embodiment, in the terminal fitting 2, in the preliminary shape, the first terminal portion 12 and the second terminal portion 14 are arranged to be fitted to each other such that the second tab portions 21 are accommodated in the gaps S1 between the adjacent first tab portions 18, and the first tab portions 18 are accommodated in the gaps S2 between the adjacent second tab portions 21. In the terminal fitting 2, in the final three-dimensional shape, the preformed body 2A having the preliminary shape is bent at the connecting portion 13, and accordingly, the first terminal portion 12 and the second terminal portion 14 are three-dimensionally arranged such that the first tab portions 18 and the second tab portions 21 are arranged in a predetermined arrangement direction (left-right direction), and the first tab continuous connecting portion 17 and the second tab continuous connecting portion 19 are arranged at intervals T in the intersection direction (up-down direction) intersecting the arrangement direction. As a result, compared with the terminal fittings of the above-described connector of the related art, the conductor plate (original plate) between the first tab portions 18 or between the second tab portions 21 is not discarded as it is, and thus the amount of discarded conductor plate (original plate) during manufacturing is reduced. Therefore, the terminal fitting 2 according to the first embodiment can improve the yield of materials when manufacturing the terminal fitting 2.

Second Embodiment

In the above-described first embodiment, the left end portions of both of the first terminal portion 12 and the second terminal portion 14 are connected to each other at the connecting portion 13, while the right ends of the first terminal portion 12 and the second terminal portion 14 are not connected to each other, and each is a free end. On the other hand, in the terminal fitting 2 according to the second embodiment, as shown in FIG. 6, the left end portions of both of the first terminal portion 12 and the second terminal portion 14 are connected to each other at the connecting portion 13, and the right end portions of both of the first terminal portion 12 and the second terminal portion 14 are connected to each other by a connecting portion 23.

Figure 5:
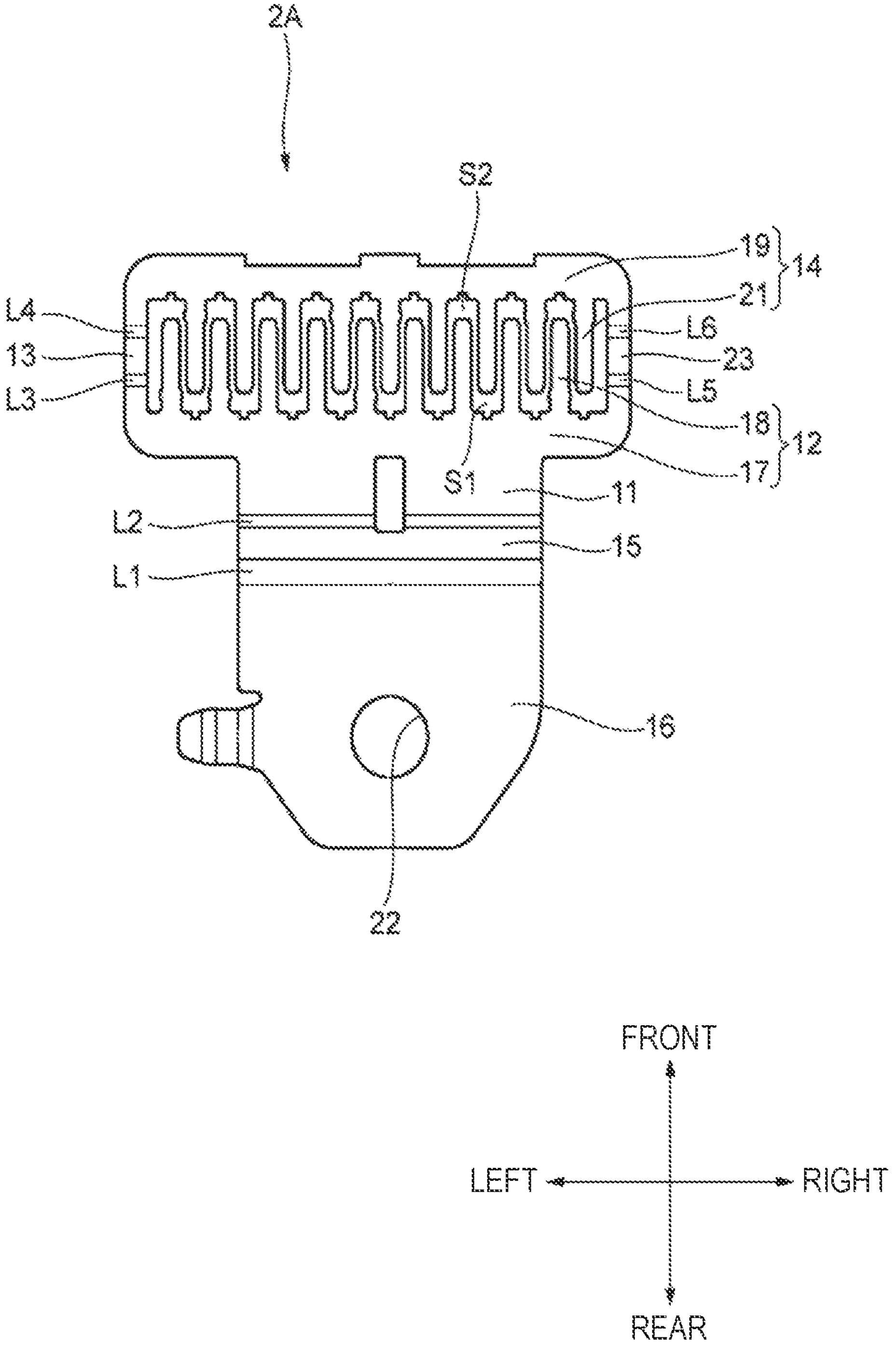
FIG. 5 is a view corresponding to FIG. 4 according to a second embodiment.
Figure 6:
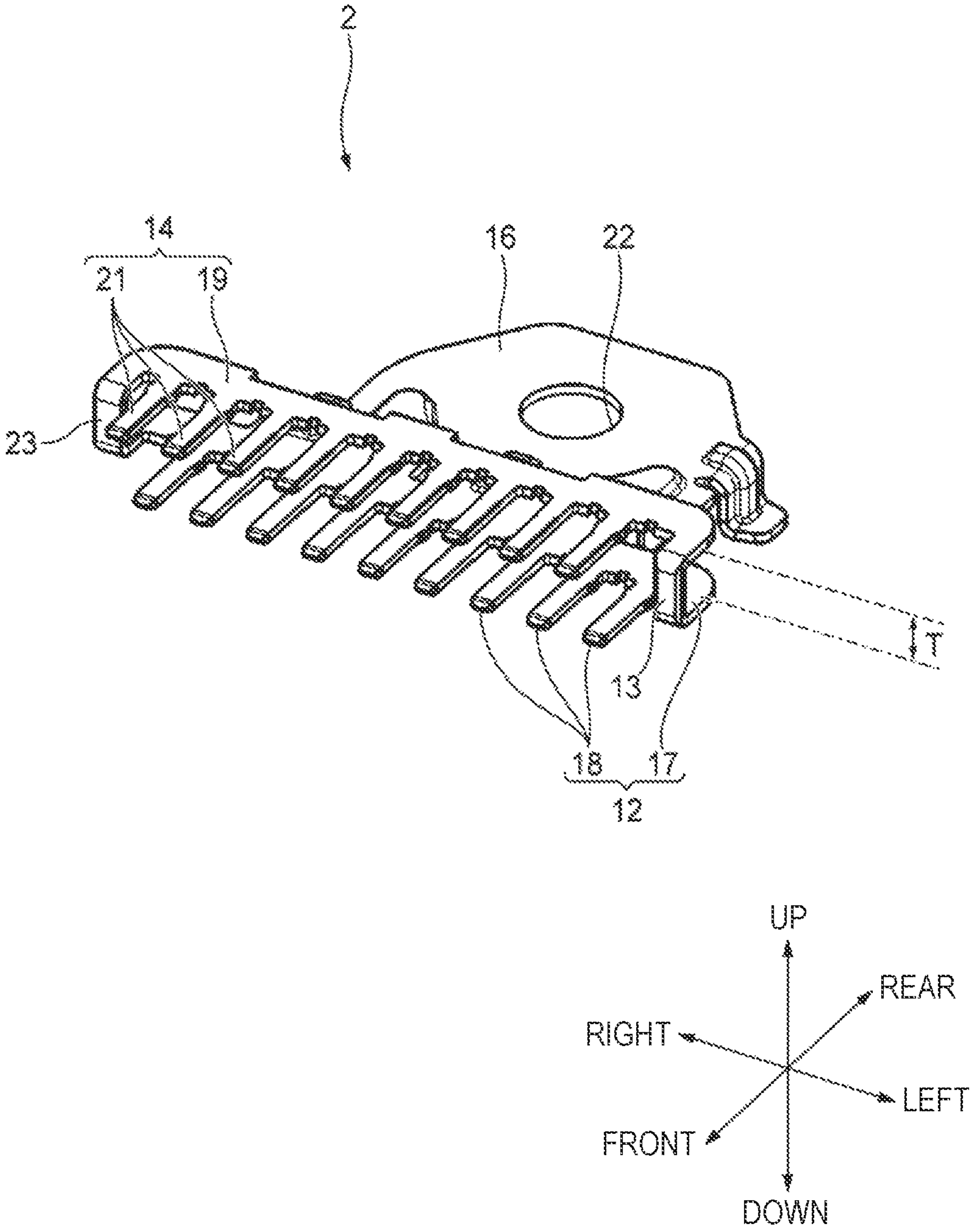
FIG. 6 is a view corresponding to FIG. 3 according to the second embodiment.

The terminal fitting 2 shown in FIG. 6 is obtained by performing 90-degree bending, with respect to the substantially flat plate-shaped preformed body 2A shown in FIG. 5, including valley-folding along a boundary line L5 between the first tab continuous connecting portion 17 and the connecting portion 23, and valley-folding along a boundary line L6 between the connecting portion 23 and the second tab continuous connecting portion 19, in addition to mountain-folding or valley-folding (here, when viewed from above (the front side of the paper surface) in FIG. 5, the same applies hereinafter) along the boundary lines L1 to L4 described above.

According to the terminal fitting 2 shown in FIG. 6, the left end portions of the first terminal portion 12 and the second terminal portion 14 are connected at the connecting portion 13, and the right end portions of the first terminal portion 12 and the second terminal portion 14 are connected to each other at the connecting portion 23. As a result, the first terminal portion 12 and the second terminal portion 14, and the connecting portion 13 and the connecting portion 23 form a closed rectangular frame when viewed from the front-rear direction. Therefore, compared to the case where the first terminal portion 12 and the second terminal portion 14 are connected only by the single connecting portion 13 as in the first embodiment, in the three-dimensional shape of the terminal fitting 2, the interval T between the first terminal portion 12 and the second terminal portion 14 in the up-down direction is maintained more firmly. Therefore, for example, it is possible to improve the workability when performing the work of attaching the terminal fitting 2 to the housing 3.

Third Embodiment

Figure 8:
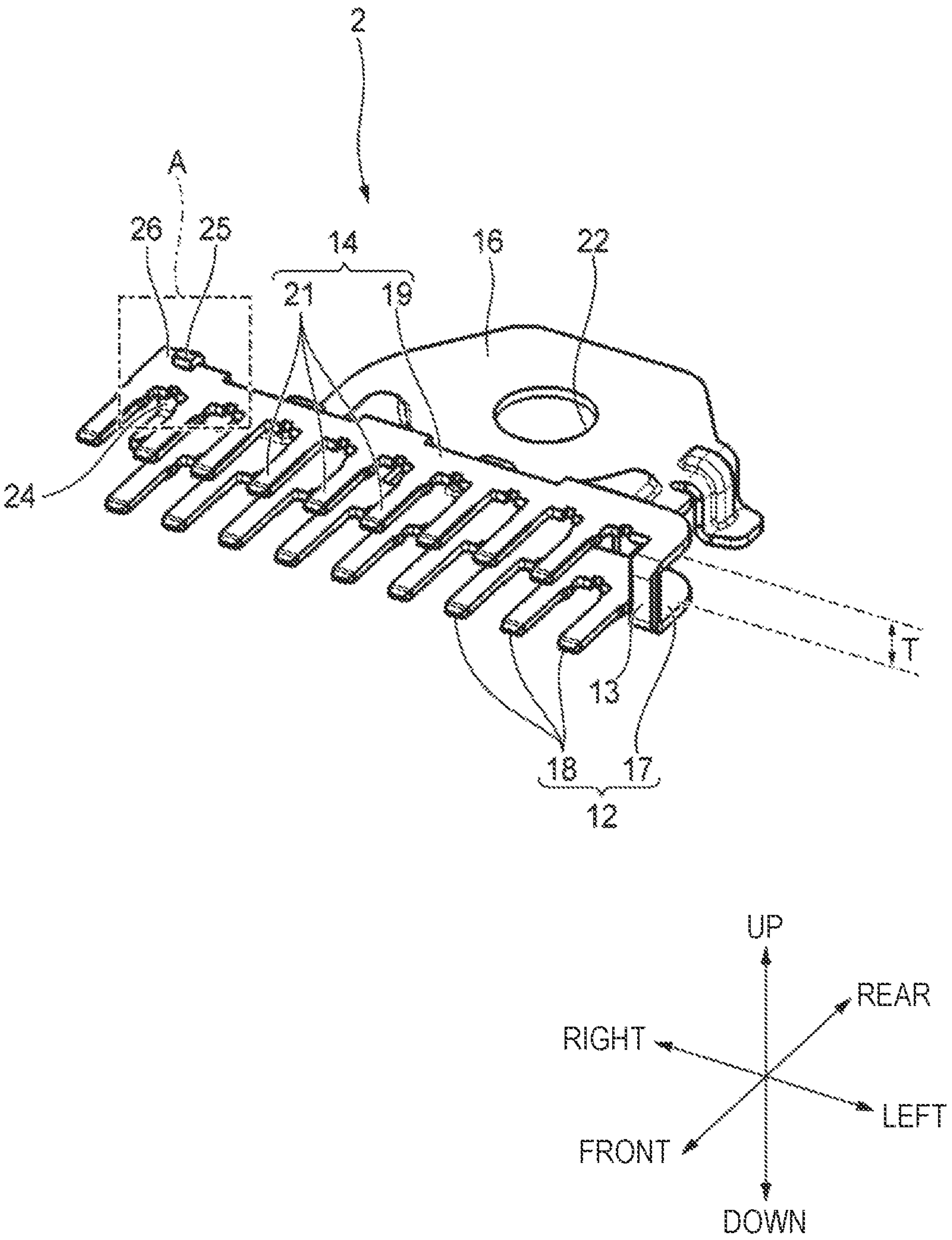
FIG. 8 is a view corresponding to FIG. 3 according to the third embodiment.

In the terminal fitting 2 according to the third embodiment, as shown in FIG. 8, the left end portions of both of the first terminal portion 12 and the second terminal portion 14 are connected to each other at the connecting portion 13, and the right end portions of both of the first terminal portion 12 and the second terminal portion 14 are connected to each other by a "connecting structure".

Figure 9:
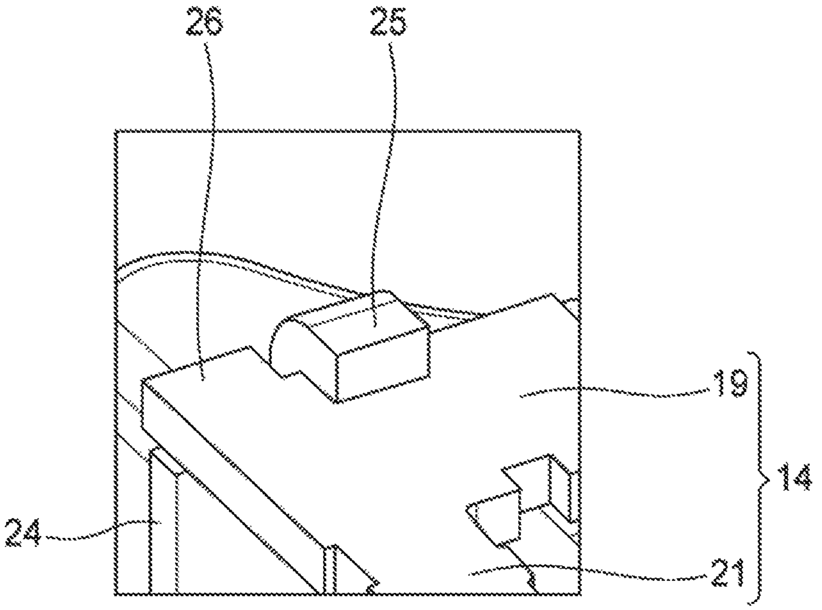
FIG. 9 is an enlarged view of a part A of FIG. 8.
Figure 9:
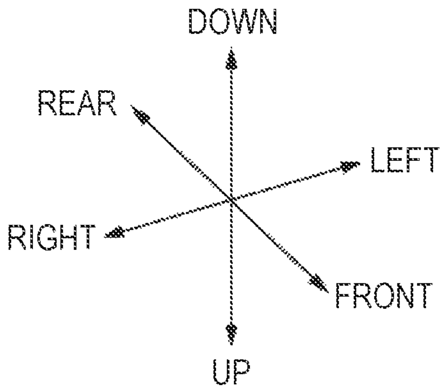

As shown in FIGS. 8 and 9, the above-mentioned "connecting structure" includes a connecting piece 24 extending upward from the right end portion of the first terminal portion 12, a fixing piece 25 extending forward from the left region of the upper end of the connecting piece 24, and a projecting piece 26 protruding rearward from the right end portion of the second terminal portion 14 (second tab continuous connecting portion 19). In the "connecting structure", the right region of the upper end of the connecting piece 24 is superimposed on the lower surface of the projecting piece 26 and the fixing piece 25 is locked to the upper surface of the rear end edge of the second terminal portion 14 (second tab continuous connecting portion 19) adjacent to the left side of the projecting piece 26, such that the right end portions of the first terminal portion 12 and the second terminal portion 14 are connected to each other.

Figure 7:
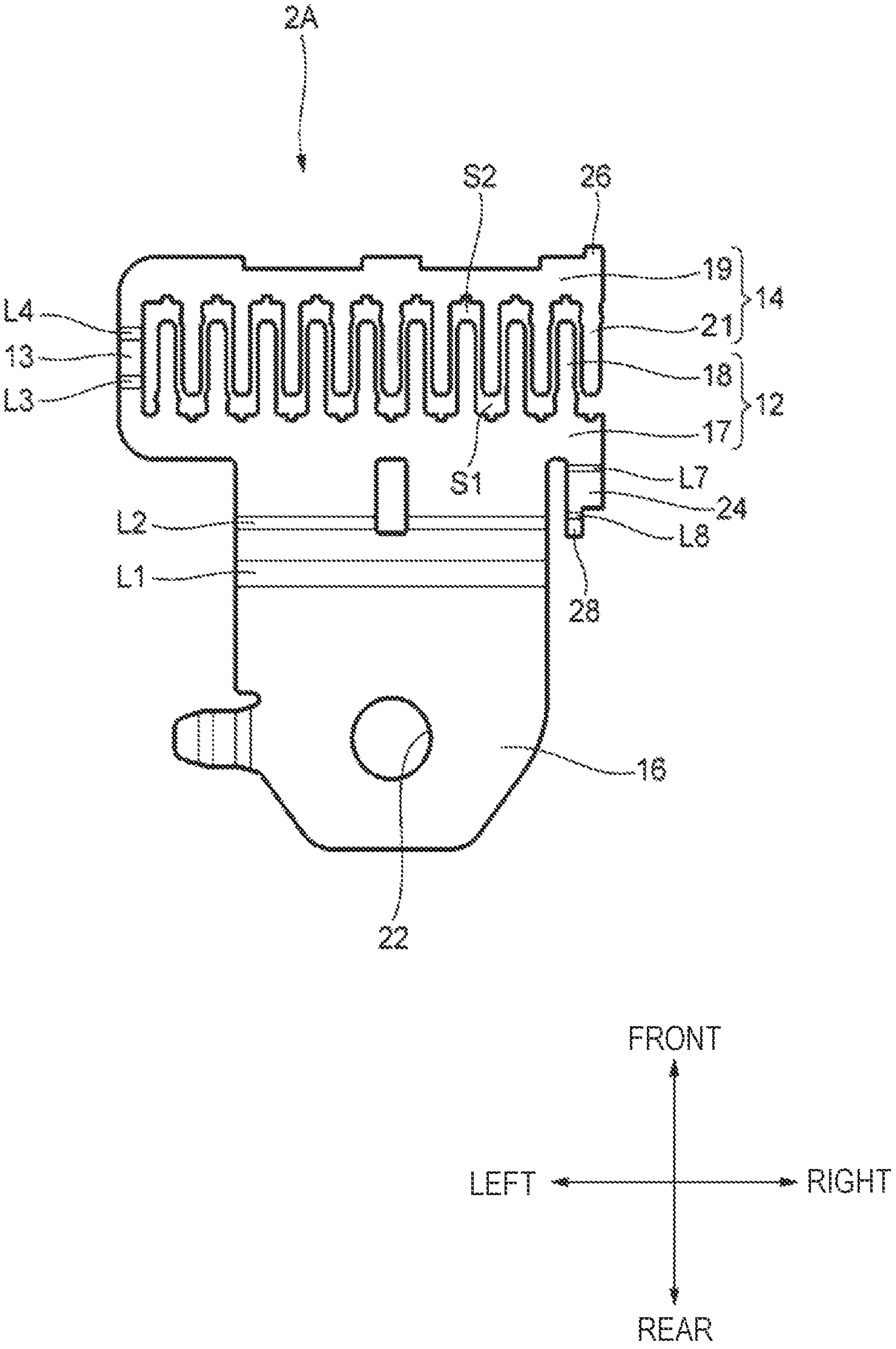
FIG. 7 is a view corresponding to FIG. 4 according to the third embodiment.

The terminal fitting 2 shown in FIG. 8 is obtained by performing 90-degree bending, with respect to the substantially flat plate-shaped preformed body 2A shown in FIG. 7, including valley-folding along a boundary line L7 between the first tab continuous connecting portion 17 and the connecting piece 24, and valley-folding along a boundary line L8 between the connecting piece 24 and the fixing piece 25, in addition to mountain-folding or valley-folding (here, when viewed from above (the front side of the paper surface) in FIG. 7, the same applies hereinafter) along the boundary lines L1 to L4 described above, and then by superimposing the right region of the upper end of the connecting piece 24 on the lower surface of the projecting piece 26 and locking the fixing piece 25 to the upper surface of the rear end edge of the second terminal portion 14 adjacent to the left side of the projecting piece 26.

According to the terminal fitting 2 shown in FIG. 8, similarly to the terminal fitting 2 according to the second embodiment shown in FIG. 6, the first terminal portion 12, the second terminal portion 14, the connecting portion 13, and the "connecting structure" configure a closed rectangular frame when viewed from the front-rear direction. Therefore, compared to the case where the first terminal portion 12 and the second terminal portion 14 are connected only by the single connecting portion 13 as in the first embodiment, in the three-dimensional shape of the terminal fitting 2, the interval T between the first terminal portion 12 and the second terminal portion 14 in the up-down direction is maintained more firmly. Therefore, for example, it is possible to improve the workability when performing the work of attaching the terminal fitting 2 to the housing 3.

OTHER ASPECTS

Note that the present disclosure is not limited to the above-described embodiments, and various modification examples can be adopted within the scope of the present disclosure. For example, the present disclosure is not limited to the above-described embodiments, and can be modified, improved, and the like as appropriate. The material, shape, size, number, location, and the like of each component in the above-described embodiment are random and not limited as long as the present disclosure can be achieved.

Here, the features of the embodiments of the terminal fitting, the connector, and the method for manufacturing the terminal fitting according to the above-described present disclosure are briefly summarized in [1] to [5] below.

[1] A terminal fitting (2) including: a first terminal portion (12) in which a plurality of first tab portions (18), extending from a first tab continuous connecting portion (17), are arranged at intervals;

a second terminal portion (14) in which a plurality of second tab portions (21), extending from a second tab continuous connecting portion (19), are arranged at intervals;

a connecting portion (13) connecting the first terminal portion (12) and the second terminal portion (14); and a contact portion (16) to be connected to an external terminal (6), in which: the first terminal portion (12), the second terminal portion (14), the connecting portion (13), and the contact portion (16) are continuous as a continuous conductor plate; the terminal fitting (2) has a three-dimensional shape in which the terminal fitting (2) having a flat plate-shaped preliminary shape is bent at the connecting portion (13), in the three-dimensional shape, the first terminal portion (12) and the second terminal portion (14) are three-dimensionally arranged to be connected at the connecting portion (13) such that the plurality of the first tab portions (18) and the plurality of the second tab portions (21) are arranged in a predetermined arrangement direction, and the first tab continuous connecting portion (17) and the second tab continuous connecting portion (19) are arranged at intervals in an intersection direction intersecting the arrangement direction, and in the preliminary shape, the first terminal portion (12) and the second terminal portion (14) are arranged to be fitted to each other and the first tab continuous connecting portion (17) and the second tab continuous connecting portion (19) are connected at the connecting portion (13) such that the second tab portion (21) is accommodated in the gap (S1) between the adjacent first tab portions (18), and the first tab portion (18) is accommodated in the gap (S2) between the adjacent second tab portions (21).

According to the terminal fitting having the configuration [1] above, in the terminal fitting, in the preliminary shape, the first terminal portion and the second terminal portion are arranged to be fitted to each other such that the second tab portions are accommodated in the gaps between the adjacent first tab portions, and the first tab portions are accommodated in the gaps between the adjacent second tab portions. In the terminal fitting, in the final three-dimensional shape, the preformed body having the preliminary shape is bent at the connecting portion, and accordingly, the first terminal portion and the second terminal portion are three-dimensionally arranged such that the first tab portions and the second tab portions are arranged in a predetermined arrangement direction, and the first tab continuous connecting portion and the second tab continuous connecting portion are arranged at intervals in the intersection direction intersecting the arrangement direction. As a result, compared with the terminal fittings of the above-described connector of the related art, the conductor plate (original plate) between the first tab portions or between the second tab portions is not discarded as it is, and thus the amount of discarded conductor plate (original plate) during manufacturing is reduced. Therefore, the terminal fitting according to the present configuration can improve the yield of materials when manufacturing the terminal fitting.

[2] The terminal fitting (2) according to [1] above, in which the first terminal portion (12) and the second terminal portion (14) are connected at a plurality of the connecting portions (13, 23).

According to the terminal fitting having the configuration [2] above, the first terminal portion and the second terminal portion are connected by a plurality of connecting portions. Accordingly, compared to the case where the first terminal portion and the second terminal portion are connected only by the single connecting portion, in the three-dimensional shape of the terminal fitting, the interval between the first terminal portion and the second terminal portion in the intersection direction is maintained more firmly. Therefore, for example, it is possible to improve the workability when performing the work of attaching the terminal fitting to the housing.

[3] The terminal fitting (2) according to [1] above, in which, in the three-dimensional shape, one of the first terminal portion (12) and the second terminal portion (14) includes fixing pieces (24, 25) extending toward the other, and the other of first terminal portion (12) and the second terminal portion (14) is engaged with the fixing pieces (24, 25).

According to the terminal fitting having the configuration [3] above, in the terminal fitting, in the three-dimensional shape, fixing pieces configuring one of the first terminal portion and the second terminal portion extend toward the other, and the other of the first terminal portion and the second terminal portion is engaged with the fixing pieces. Accordingly, compared to the case where the first terminal portion and the second terminal portion are connected only by the single connecting portion, in the three-dimensional shape of the terminal fitting, the interval between the first terminal portion and the second terminal portion in the intersection direction is maintained more firmly. Therefore, for example, it is possible to improve the workability when performing the work of attaching the terminal fitting to the housing.

[4] A connector (1) including: the terminal fitting (2) according to any one of [1] to [3] above; and a housing (3) which includes a plurality of terminal accommodating chambers (31, 32) for accommodating the plurality of first tab portions (18) and the plurality of second tab portions (21), and to which the terminal fitting (2) is attached.

According to the connector having the configuration [4] above, in the terminal fitting, in the preliminary shape, the first terminal portion and the second terminal portion are arranged to be fitted to each other such that the second tab portions are accommodated in the gaps between the adjacent first tab portions, and the first tab portions are accommodated in the gaps between the adjacent second tab portions. In the terminal fitting, in the final three-dimensional shape, the preformed body having the preliminary shape is bent at the connecting portion, and accordingly, the first terminal portion and the second terminal portion are three-dimensionally arranged such that the first tab portions and the second tab portions are arranged in a predetermined arrangement direction, and the first tab continuous connecting portion and the second tab continuous connecting portion are arranged at intervals in the intersection direction intersecting the arrangement direction. As a result, compared with the terminal fittings of the above-described connector of the related art, the conductor plate (original plate) between the first tab portions or between the second tab portions is not discarded as it is, and thus the amount of discarded conductor plate (original plate) during manufacturing is reduced. As a result, it is possible to improve the yield of materials when manufacturing terminal fittings. Therefore, the connector having the present configuration can improve the yield of materials when manufacturing terminal fittings.

[5] A method for manufacturing the terminal fitting (2) according to any one of [1] to [3] above, the method including: a step of manufacturing a preformed body (2A) in which the first terminal portion (12) and the second terminal portion (14) are fitted to each other and connected at the connecting portion (13) such that the second tab portions (21) are accommodated in the gaps (S1) between the adjacent first tab portions (18) and the first tab portions (18) are accommodated in the gaps (S2) between the adjacent second tab portions (21), by punching a flat plate-shaped conductor plate; and a step of three-dimensionally arranging the first terminal portion (12) and the second terminal portion (14) such that the plurality of the first tab portions (18) and the plurality of the second tab portions (21) are arranged in the arrangement direction, and the first tab continuous connecting portion (17) and the second tab continuous connecting portion (19) are arranged at intervals in an intersection direction intersecting the arrangement direction, by bending the preformed body (2A) at the connecting portion (13).

According to the method for manufacturing the terminal fitting having the configuration [5] above, in the terminal fitting, in the preliminary shape, the first terminal portion and the second terminal portion are arranged to be fitted to each other such that the second tab portions are accommodated in the gaps between the adjacent first tab portions, and the first tab portions are accommodated in the gaps between the adjacent second tab portions. In the terminal fitting, in the final three-dimensional shape, the preformed body having the preliminary shape is bent at the connecting portion, and accordingly, the first terminal portion and the second terminal portion are three-dimensionally arranged such that the first tab portions and the second tab portions are arranged in a predetermined arrangement direction, and the first tab continuous connecting portion and the second tab continuous connecting portion are arranged at intervals in the intersection direction intersecting the arrangement direction. As a result, compared with the terminal fittings of the above-described connector of the related art, the conductor plate (original plate) between the first tab portions or between the second tab portions is not discarded as it is, and thus the amount of discarded conductor plate (original plate) during manufacturing is reduced. As a result, it is possible to improve the yield of materials when manufacturing terminal fittings. Therefore, the method for manufacturing the present configuration can improve the yield of materials when manufacturing terminal fittings.

What is claimed is:

1. A terminal fitting comprising:

a first terminal portion in which a plurality of first tab portions, extending from a first tab continuous connecting portion, are arranged at intervals;

a second terminal portion in which a plurality of second tab portions, extending from a second tab continuous connecting portion, are arranged at intervals;

a connecting portion connecting the first terminal portion and the second terminal portion; and a contact portion to be connected to an external terminal, wherein:

the first terminal portion, the second terminal portion, the connecting portion, and the contact portion are continuous as a continuous conductor plate;

the terminal fitting has a three-dimensional shape in which the terminal fitting having a preliminary shape, being flat plate-shape, is bent at the connecting portion;

in the three-dimensional shape, the first terminal portion and the second terminal portion are three-dimensionally arranged to be connected at the connecting portion such that the plurality of the first tab portions and the plurality of the second tab portions are arranged in a predetermined arrangement direction, and the first tab continuous connecting portion and the second tab continuous connecting portion are arranged at intervals in an intersection direction intersecting the arrangement direction; and in the preliminary shape, the first terminal portion and the second terminal portion are arranged to be fitted to each other, and the first tab continuous connecting portion and the second tab continuous connecting portion are connected at the connecting portion such that the second tab portion is accommodated in the gap between the adjacent first tab portions, and the first tab portion is accommodated in the gap between the adjacent second tab portions.

2. The terminal fitting according to claim 1, wherein the first terminal portion and the second terminal portion are connected at a plurality of the connecting portions.

3. The terminal fitting according to claim 1, wherein in the three-dimensional shape, one of the first terminal portion and the second terminal portion includes fixing pieces extending toward the other, and the other of first terminal portion and the second terminal portion is engaged with the fixing pieces.

4. A connector comprising:

a terminal fitting including:

a first terminal portion in which a plurality of first tab portions, extending from a first tab continuous connecting portion, are arranged at intervals;

a second terminal portion in which a plurality of second tab portions, extending from a second tab continuous connecting portion, are arranged at intervals;

a connecting portion connecting the first terminal portion and the second terminal portion; and a contact portion to be connected to an external terminal; and a housing which includes a plurality of terminal accommodating chambers for accommodating the plurality of first tab portions and the plurality of second tab portions, and to which the terminal fitting is attached, wherein:

the first terminal portion, the second terminal portion, the connecting portion, and the contact portion are continuous as a continuous conductor plate;

the terminal fitting has a three-dimensional shape in which the terminal fitting having a preliminary shape, being flat plate-shape, is bent at the connecting portion;

in the three-dimensional shape, the first terminal portion and the second terminal portion are three-dimensionally arranged to be connected at the connecting portion such that the plurality of the first tab portions and the plurality of the second tab portions are arranged in a predetermined arrangement direction, and the first tab continuous connecting portion and the second tab continuous connecting portion are arranged at intervals in an intersection direction intersecting the arrangement direction; and in the preliminary shape, the first terminal portion and the second terminal portion are arranged to be fitted to each other, and the first tab continuous connecting portion and the second tab continuous connecting portion are connected at the connecting portion such that the second tab portion is accommodated in the gap between the adjacent first tab portions, and the first tab portion is accommodated in the gap between the adjacent second tab portions.

5. A method for manufacturing a terminal fitting, including: a first terminal portion in which a plurality of first tab portions, extending from a first tab continuous connecting portion, are arranged at intervals; a second terminal portion in which a plurality of second tab portions, extending from a second tab continuous connecting portion, are arranged at intervals; a connecting portion connecting the first terminal portion and the second terminal portion; and a contact portion to be connected to an external terminal, in which: the first terminal portion, the second terminal portion, the connecting portion, and the contact portion are continuous as a continuous conductor plate; the terminal fitting has a three-dimensional shape in which the terminal fitting having a preliminary shape, being flat plate-shape, is bent at the connecting portion; in the three-dimensional shape, the first terminal portion and the second terminal portion are three-dimensionally arranged to be connected at the connecting portion such that the plurality of the first tab portions and the plurality of the second tab portions are arranged in a predetermined arrangement direction, and the first tab continuous connecting portion and the second tab continuous connecting portion are arranged at intervals in an intersection direction intersecting the arrangement direction; and in the preliminary shape, the first terminal portion and the second terminal portion are arranged to be fitted to each other, and the first tab continuous connecting portion and the second tab continuous connecting portion are connected at the connecting portion such that the second tab portion is accommodated in the gap between the adjacent first tab portions, and the first tab portion is accommodated in the gap between the adjacent second tab portions, the method comprising:

manufacturing a preformed body in which the first terminal portion and the second terminal portion are fitted to each other and connected at the connecting portion such that the second tab portions are accommodated in the gaps between the adjacent first tab portions and the first tab portions are accommodated in the gaps between the adjacent second tab portions, by punching a flat plate-shaped conductor plate; and three-dimensionally arranging the first terminal portion and the second terminal portion such that the plurality of the first tab portions and the plurality of the second tab portions are arranged in the arrangement direction, and the first tab continuous connecting portion and the second tab continuous connecting portion are arranged at intervals in an intersection direction intersecting the arrangement direction, by bending the preformed body at the connecting portion.

* * * * *